United States Patent

Vlaeminck

[15] 3,660,681

[45] May 2, 1972

[54] SIGNAL TRANSMISSION SYSTEM WITH A VARIABLE LEVEL CLIPPING CIRCUIT

[72] Inventor: Noel Vlaeminck, Antwerp, Belgium

[73] Assignee: Automatic Electric Laboratories, Inc., Northlake, Ill.

[22] Filed: Mar. 26, 1970

[21] Appl. No.: 30,615

Related U.S. Application Data

[62] Division of Ser. No. 701,264, Jan. 29, 1968, Pat. No. 3,562,745.

[52] U.S. Cl. ....................307/237, 307/293

[51] Int. Cl. ....................H03k 5/08

[58] Field of Search ....................307/237, 293

[56] References Cited

UNITED STATES PATENTS 3,023,355 2/1962 Thorsen ....................307/237 X 3,188,554 6/1965 Reid ....................307/237 X 3,337,749 8/1967 Lee et al. ....................307/237 X

*Primary Examiner*—John Zazworsky

*Attorney*—Cyril A. Krenzer, K. Mullerheim and B. E. Franz

[57] ABSTRACT

A multifrequency signaling system transmitter having a circuit to clip the multifrequency pulse data signals at a variable level to minimize transients generated upon switching signal sources on and off the transmission line. The clipping level is determined by the voltage applied across a pair of diodes by an exponentially varying voltage of charging or discharging capacitors, varying from a completely short-circuited state when the diodes are conducting in series, to the maximum value of the signal when the diodes are non-conductive. The charging or discharging of these capacitors is controlled by a pair of transistors that are switched by an external circuit applying the signal to the line.

1 Claims, 4 Drawing Figures

PATENTED MAY 2 1972 3,660,681

INVENTOR
NOEL VLAEMINCK
BY Bernard E. Franz
ATTORNEY

SIGNAL TRANSMISSION SYSTEM WITH A VARIABLE LEVEL CLIPPING CIRCUIT

CROSS-REFERENCES TO RELATED APPLICATIONS

This is a division of application Ser. No. 701,264, now U.S. Pat. No. 3,562,745 filed Jan. 29, 1968.

BACKGROUND OF THE INVENTION

1. Field of the Invention

This invention relates to an electronic multifrequency signaling system and more particularly to a multifrequency transmitter including means for switching the signal frequency generators on and off the transmission line.

2. Description of the Prior Art

In multifrequency signaling systems digital or other information is transmitted in the form of pulses each comprising a combination of two or more frequencies selected from a plurality of available frequencies in accordance with the information to be conveyed. For example, the value of a decimal digit may be transmitted by means of a single pulse comprising a unique combination of two frequencies chosen from an available group of six frequencies in accordance with a so-called two-out-of-six code. These signaling systems, for which the frequencies employed are commonly within the voice frequency range, but may be in other ranges, are for convenience called multiple-frequency pulse signalling systems. It should be appreciated that the multiple frequencies are those constituting the pulses and do not refer to the pulse repetition rate.

This type of multiple frequency pulse signaling system using voice frequencies is sometimes employed for transmitting via a voice frequency transmission path to a remote register, during the process of setting up a telephone connection, digital information which relates to the number of a called or calling party or to a route between switching centers involved in the connection. Thus, when a trunk connection or other voice frequency transmission path has been established to a register at a remote location and this fact has been signaled by, say some form of line signaling equipment, then a manually operated keyset or an automatic sender may bring about, as in already known telephone systems employing multifrequency signaling, the transmission of digital signals each in the form of a pulse comprising a combination of voice frequencies according to a particular code.

In the known systems, the sources which provide the frequencies constituting a particular signal are applied in parallel to the transmission path through an isolating network. A receiver at the register location includes a common limiting amplifier feeding a number of frequency detectors, of which there is one tuned to each of the signaling frequencies. Each frequency detector comprises a narrow bandpass filter, a rectifying circuit, and a relay which is actuable from its normal unoperated condition to its operated condition on detection of the frequency to which the detector is tuned. This type of operation, however, is troubled with the transients that are generated when a relatively high voltage signal is switched onto a transmission line. Being used to convey digital information, such signals must be received without error, and transients generated by the sudden application of these signals influence the receiving filters, other than those that are to respond to the transmitted signal, and can cause an erroneous response.

SUMMARY OF THE INVENTION

The multifrequency transmitter according to the invention gradually impresses the signal upon the line and then slowly removes it therefrom, and thus minimizes the transients generated during this switching operation.

This is accomplished by connecting a pair of clipping diodes to the line and then controlling the level at which the clipping occurs by a resistance-capacitance network. The rate of change of the clipping level is determined by the resistor and capacitor constants of the network. The charged or discharged condition of the network is determined by a pair of transistors which respond to an external control.

BRIEF DESCRIPTION OF THE DRAWING

The novel features which are believed to be characteristic of the invention both as to its organization and method of operation will be more apparent from the following detailed description, taken in conjunction with the drawing, in which.

Figure 1:
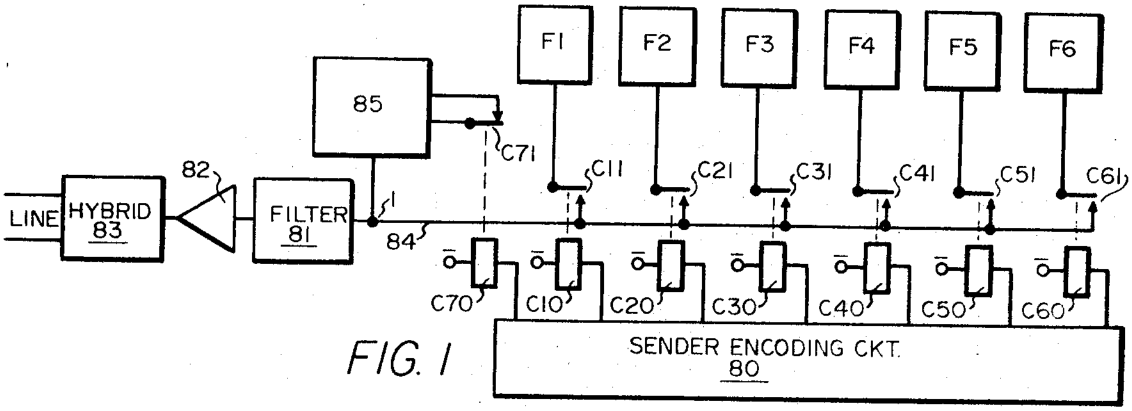
FIG. 1 is a simplified block diagram of a multifrequency transmitter according to the invention.

The illustration of FIG. 1 shows only those portions of a multifrequency sender system as are required for an understanding of the novel system having a variable level clipping circuit. The signal frequency generators are shown as blocks designated F1 through F6. A corresponding group of relays C10 through C60 are shown to control the contacts C11 through C61 for applying the respective frequencies to the line 1. These relays are under the control of a sender encoding circuit 80 which, in turn, is controlled by common control equipment (not shown). Relays C10 through C60 function to apply the associated frequencies through the filter 81, amplifier 82 and a hybrid circuit 83 to the transmission line, as well as perform other necessary functions of the signaling operation. These functions could include the operation of contacts connected to a control circuit for checking the two-out-of-six code, and for switching out matching resistors that are used to match the transmission equipment when no sending is taking place. To insure that the frequency signals upon application to the line 1 do not produce undesirable transients, circuit 85 is connected at this point. This circuit operates to gradually increase the signal to its full value and then to attenuate it completely, when it is required to remove it from the line.

Figure 2:
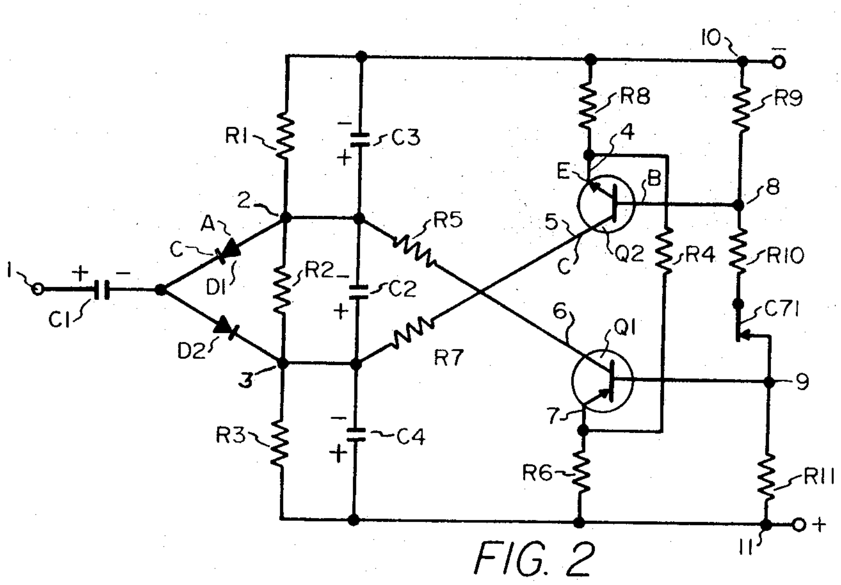
FIG. 2 is a schematic of the preferred embodiment of the clipping circuit of the invention.

The selected pair of frequencies for a particular code are applied by the operation of the relays C10 through C60 which operate their associated contacts C11 through C61 to apply the corresponding frequency generators output to a common conductor 84. Conductor 84 conducts the applied signal through filter 81, designed to pass only frequencies within a certain band of frequencies, an amplifier 82 to bring the signal strength up to the desired level, and hybrid 83 to apply the amplified and filtered signal to the line for transmission to its destination. However, whenever any of the relays C10 through C60 is operated, relay C70 is also operated to open its associated contacts C71. Operation of contacts C71 initiates a shift in operation of the variable level clipping circuit 85, which when contacts C71 are closed, is operative to shunt out any signal appearing at point 1 on conductor 84. Thus, as the clipping level is being increased by circuit 85, the level of the signal is also progressively increased to its maximum level. When transmission of the signal is to cease, relay C70 is first released, closing contacts C71 to in turn control the variable level clipping circuit 85 to slowly decrease the clipping level and thus remove the signal from the line, after which time any of the operated relays C10 through C60 are released and the sender is prepared to transmit the next code. The variable level clipping circuit 85 is controlled by contacts C71 to exercise its clipping functions at terminal 1. These contacts and terminal correspond to the contacts and terminal marked with the same designations in FIG. 2. FIG. 2 is a schematic of the circuit within block 85.

Briefly, the circuit of FIG. 2 comprises its clipping diodes D1 and D2 coupled through capacitor C1 to terminal 1, clipping level determining voltage divider resistors and associated capacitors C2, C3 and C4, and discharge switching transistors Q1 and Q2 which are controlled by contacts C71.

Considering first the switching elements of the circuit, transistors Q1 and Q2 of the PNP and NPN type, respectively, are so connected in the circuit by associated biasing resistors as to have two basic operating states, either fully conductive or nonconductive, determined by opening and closing respectively of contacts C71. The emitter of Q1 is connected to a source of positive potential at terminal 11 through resistor R6, while the emitter of Q2 is connected to a source of negative potential at terminal 10 through resistor R8. A resistor R4 connected to both emitter terminals completes a voltage divider bias arrangement, to maintain the respective emitters at the proper relative voltages during their non-conductive states.

The collector of transistor Q1 is connected to the negative voltage source through resistors R5 and R1. The collector of the transistor Q2 is connected to the positive voltage source through resistors R7 and R3.

A capacitor C3 is connected across resistor R1, and similarly, a capacitor C4 is shunted across resistor R3. Connected between the terminals of resistors R1 and R3 away from the respective voltage source terminals, marked 2 and 3, respectively, is a parallel combination of resistor R2 and capacitor C2. Capacitors C2, C3 and C4 together with resistors R1, R2 and R3 comprises the resistor-capacitor circuit for controlling the slope of the clipping rate. A pair of diodes D1 and D2 are serially connected in that order between terminals 2 and 3, with the anode of D1 connected to terminal 2 and the cathode of D2 connected to terminal 3. Terminal 2 is also connected to the junction of resistor R5 and capacitor C3. Similarly, terminal 3 is connected to the junction of resistor R7 with capacitor C4. The junction between diodes D1 and D2 is coupled through capacitor C1 to terminal 1, the point at which the signal whose amplitude is to be modified is connected. This diode limiting or clipping circuit is used to limit the peak-to-peak voltage of a waveform to a given amplitude. In this circuit the diodes are in parallel with the frequency signal generating input circuits F1 through F6 shown in FIG. 1 and operate to conduct when the peak input voltage exceeds a given biasing voltage level on the diodes. This biasing voltage is that supplied by the charge on the capacitors C2, C3 and C4.

Also connected across the voltage source in series from the negative terminal 10 to the positive terminal 11 are resistor R9, resistor R10, break contacts C71 and resistor R11. The junction 8 of resistors R9 and R10 is connected to the base of transistor Q2, while the junction 9 of resistor R11 and one of the break contacts C71 is connected to the base of Q1. With contacts C71 closed as shown, the transistors Q1 and Q2 are biased to be fully conductive. Thus, transistor Q1 serves to conduct away any charge on capacitors C2 and C4 while transistor Q2 conducts away the charge that appears on capacitors C2 and C3. Upon the opening of the contacts C71, the two transistors are switched to a non-conductive state to permit the capacitors to again start to charge at a rate determined by the resistors R1, R2 and R3.

When contacts C71 are open the two transistors Q1 and Q2 are off, that is, they are not conducting due to the reverse bias of the emitter-base junction. This condition is brought about for transistor Q1 a PNP type by the positive potential through resistor R11, while the emitter is connected to the negative potential through resistors R4 and R8. For transistor Q2 a NPN type the base is biased by the negative potential through resistor R9 while its emitter is biased to the positive potential through resistors R4 and R6.

With both transistors off, the two diodes D1 and D2 are reverse biased and non-conductive. Any signal at terminal 1 is unaffected and passes on. The circuit paths for maintaining this reverse bias on the diodes is from the negative potential through resistor R1 to the anode of diode D1, and from the positive potential through resistor R3 to the cathode of diode D2.

When contacts C71 are closed the two transistors Q1 and Q2 are fully conducting. This is caused by the change in bias at the bases of the transistors. The base of transistor Q1 is made more negative, while the base of transistor Q2 is made more positive. Both of the foregoing conditions are brought about by the voltage current distribution through the voltage divider resistors R9, R10, Contacts C71 and R11.

With both transistors conducting, the two diodes D1 and D2 are forward biased and fully conductive. The biasing potential at junction 2, the anode of diode D1 is now at approximately 16.5 V positive with respect to negative battery. The main path, resulting in this potential is from negative battery at terminal 10 through the voltage divider resistors R1(1KΩ), R5 (470Ω), collector-emitter path of Q1, and R6 (22Ω) to positive battery at terminal 1. There is about a 16.5 volt drop across R1 and an 8.5 volt drop across R5 and R6.

The biasing potential at junction 3, the cathode of diode D2, is at approximately 8.5 volt positive with respect to negative battery. The path for obtaining this is similar to that for junction 2; it is from negative battery at terminal 10 through the voltage divider resistors R8 (22Ω), emitter-collector path of Q2, R7 (470Ω) and R3 (1 KΩ) to positive battery at terminal 11. Thus it can be seen that there is approximately an 8 volt forward bias for the two diodes from 16.5 at junction 2 to 8.5 volts at junction 3. This is a shift of 11.5 volts at each terminal in opposite relative directions when compared to the voltages existing at junctions 2 and 3 with the contacts C71 open, where junction 2 is approximately 5 volts positive and junction 3 is approximately 20 volts positive.

From the above it can be seen that the conductive or nonconductive state of the two diodes is dependent upon the closed or open state of contacts C71. An additional factor of time also enters in, in that the circuit has a delay built into it, causing the conductive state of the diodes to change gradually. This delay is due to the charging rate of capacitors C2, C3 and C4. A capacitor's charge rate is roughly computed by the use of the equation $T=10RC$ where $T$ is in seconds, $C$ in farads and $R$ in ohms. Applying the constants of applicant's circuit we have for capacitor C3 and Resistor R1 the following equation $T=(5\times10^{-6})\times(10^{3})=5$ milliseconds.

An operative embodiment of the circuit illustrated in FIG. 2 has been constructed and successfully operated with the following component values and a voltage supply of 24V:

| | | |
|---|---|---|
| Resistors R1 and R3 | ohms | 1,000 |
| Resistor R2 | ohms | 3,000 |
| Resistor R4 | ohms | 2,200 |
| Resistors R5 and R7 | ohms | 470 |
| Resistors R6 and R8 | ohms | 22 |
| Resistors R9 and R11 | ohms | 5,000 |
| Resistor R10 | ohms | 10,000 |
| Capacitor C1 | mf | 25 |
| Capacitors C2, C3 and C4 | mf | 5 |
| Transistor Q1 | | 2N1377 |
| Transistor Q2 | | 2N388A |

Diodes D1 and D2 (mfg. Beige de Lamps Elect.) QA5

Figure 3:
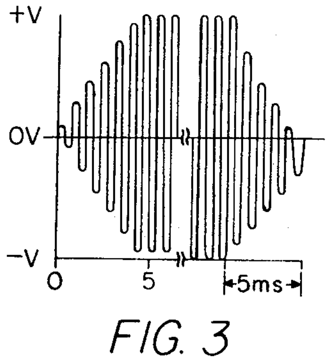
FIGS. 3 and 4 are waveforms showing the effect of this circuit upon the signals impressed upon the line.
Figure 4:
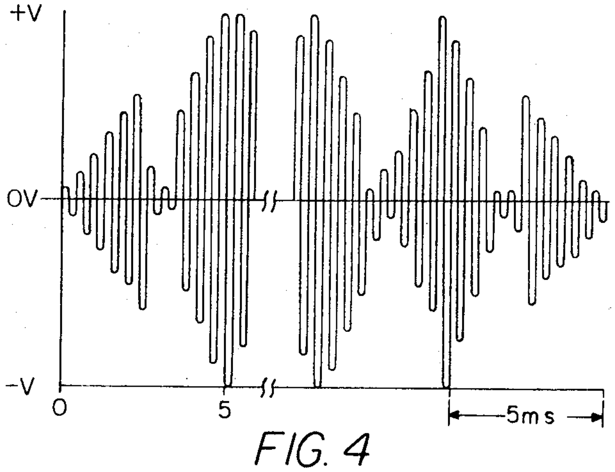

With the above values the circuit of FIG. 2 functioned to vary the signal in 5 milliseconds from no signal to the operating level, as well as from the operating level to no signal. FIG. 3 is a drawing of an oscilloscope trace when a single frequency of 1,980 Hz is applied to the line and shows the effects of the variable clipping level circuit upon the signal. The trace of FIG. 4 is that of an actual signal having 1,860 Hz and 1,980 Hz components. A beating effect is evident and somewhat obscures the variable clipping effect at the start and termination of the trace.

It will be apparent that applicant has provided an improved multifrequency signaling transmission system utilizing a clipping level circuit in which the level of clipping is varied by means of the changing bias provided by the RC circuit and its associated charge and discharge control means, to thereby gradually apply and remove a signal code to the transmission means. Various changes and alternative implementations will now occur to those skilled in the art without departing from the true spirit and scope of the invention. Accordingly, it is not intended that the invention be limited to that which has been particularly shown and described except as such limitations appear in the appended claims.

What is claimed is:

1. In a variable voltage limiting circuit the combination comprising: a single input terminal, first and second unidirectional conduction devices having unlike poles coupled to said input terminal and providing parallel conducting paths from said input terminal, a first, a second and a third resistor connected in series across the negative and positive terminals of a voltage source, a first, a second and a third capacitor connected in shunt of said respective resistors, the remaining poles of said first and said second unidirectional conduction devices connected to the junctions of said first and second, and said second and third resistors, respectively, whereby said capacitors will charge to their maximum voltage and said unidirectional conduction devices remain biased in a non-conducting state, a first controlled shorting circuit connected from the negative terminal of said voltage source and said remaining pole of said second unidirectional conduction device, and a second controlled shorting circuit connected from the positive terminal of said voltage source and said remaining pole of said first unidirectional conduction device with a common control means for both said first and said second controlled shorting circuits, said first and second controlled shorting circuits operated in response to said control means to short said first, second and third capacitors whereby said unidirectional conduction devices are progressively placed in a fully conductive state as the capacitors become discharged.

* * * * *

UNITED STATES PATENT OFFICE
CERTIFICATE OF CORRECTION

Patent No. 3,660,681 Dated May 2, 1972

Inventor(s) NOEL VLAEMINCK

It is certified that error appears in the above-identified patent and that said Letters Patent are hereby corrected as shown below:

On the front page of the patent, item [73] Assignee, delete "AUTOMATIC ELECTRIC LABORATORIES, INC." and add -- GTE AUTOMATIC ELECTRIC LABORATORIES INCORPORATED --.

Signed and sealed this 17th day of April 1973.

(SEAL)
Attest:

EDWARD M.FLETCHER,JR.
Attesting Officer

ROBERT GOTTSCHALK
Commissioner of Patents